(12) United States Patent
Eberhardt et al.

(10) Patent No.: US 6,609,663 B1
(45) Date of Patent: Aug. 26, 2003

(54) MARKING DEVICE

(75) Inventors: Wolfgang Eberhardt, Jülich (DE); Jan Morenzin, Hennef (DE)

(73) Assignee: Forschungszentrum Julich GmbH, Julich (DE)

( * ) Notice: Subject to any disclaimer, the term of this patent is extended or adjusted under 35 U.S.C. 154(b) by 0 days.

(21) Appl. No.: 09/831,702
(22) PCT Filed: Nov. 3, 1999
(86) PCT No.: PCT/EP99/08433
§ 371 (c)(1),
(2), (4) Date: May 9, 2001
(87) PCT Pub. No.: WO00/30029
PCT Pub. Date: May 25, 2000

(30) Foreign Application Priority Data

Nov. 13, 1998 (DE) .......................................... 198 52 368

(51) Int. Cl.[7] ............................................... G06K 19/06
(52) U.S. Cl. ...................................................... 235/493
(58) Field of Search ................................. 235/493, 449

(56) References Cited

U.S. PATENT DOCUMENTS

| 5,159,513 A | 10/1992 | Dieny et al. | |
| 5,163,031 A | 11/1992 | Osato | |
| 5,430,695 A | * 7/1995 | Matsumoto | 360/59 |
| 5,480,685 A | * 1/1996 | Suzuki et al. | 235/493 |
| 5,538,803 A | 7/1996 | Gambino et al. | |
| 5,844,755 A | * 12/1998 | Yamane et al. | 338/32 R |

FOREIGN PATENT DOCUMENTS

| DE | 28 27 429 | 1/1979 |
| EP | 0 258 978 | 3/1988 |
| EP | 0 330 394 | 8/1989 |
| EP | 0 346 817 B1 | 12/1989 |
| EP | 0 364 196 | 4/1990 |
| EP | 0 492 553 A2 | 7/1992 |
| EP | 0 612 066 A1 | 8/1994 |
| EP | 0 650 142 A1 | 4/1995 |
| EP | 0 718 824 A1 | 6/1996 |

OTHER PUBLICATIONS

Layered Magnetic Structures: Evidence for Antiferromagnetic Coupling; Nov. 11, 1986.

* cited by examiner

*Primary Examiner*—Karl D. Frech
*Assistant Examiner*—Lisa M Caputo
(74) *Attorney, Agent, or Firm*—Herbert Dubno

(57) ABSTRACT

The inventive marking device (1) for applying to objects has a magnetic coding with areas of different magnetisation. According to the invention, the coding has at least one magnetic base layer (3) and at least one magnetic coding layer (5) and these are configured in such a way as to produce areas with non-parallel or antiparallel magnetic coupling over the length of the base layer (3) or coding layer (5).

6 Claims, 3 Drawing Sheets

MARKING DEVICE

CROSS REFERENCE TO RELATED APPLICATIONS

This application is a national stage of PCT/EP99/08433 filed Nov. 3, 1999 and based upon German national application 19852368.8 of Nov. 13, 1998 under the International Convention.

FIELD OF THE INVENTION

The invention relates to a marking device for application to objects and having a magnetic coding with areas of different magnetization.

BACKGROUND OF THE INVENTION

For marking and thus individual correlation and securing of credit cards, access cards, electronic keys or the like, various magnetic codings are used, usually in the form of a so-called magnetic strip. For the coding, a terminal magnetic strip is magnetized selectively, i.e. areawise. The magnetic signature or coding can be detected with corresponding sensors and then processed correspondingly for the respective purposes. The nonmarking devices based upon a magnetic coding have the disadvantage they can are relatively simply reproduced or reset and thus afford only slight protection against falsification. In addition, such marking devices are sensitive to external magnetic fields and also tend to become weakened with respect to the strength of the magnetization with long term storage and under external influences (magnetic fields, temperature, etc) and can be completely lost.

OBJECT OF THE INVENTION

It is the object of the invention to provide a marking device of the type described at the outset which has a high degree of security against falsification, is insensitive to external magnetic fields and cannot lose the coding.

SUMMARY OF THE INVENTION

This object is achieved in accordance with the invention in that the coding has at least one magnetic base layer and at least one magnetic coding layer which are so interrelated that over the extent of the base layer or the coding layer, they provide areas of nonparallel or antiparallel magnetic coupling.

The basic principle of the invention is thus to use two thin magnetic layers for the coding and thereby make use of the effect of magnetic interlayer coupling. This effect is known per se (P. Grünberg et al., Layered Magnetic Structures: Evidence for Antiferromagnetic Coupling of Fe Layers across Cr Interlayers, Physical Review Letters, Volume 57, No. 19, 1986, P. 2442 to 2445) and is primarily used for magnetic field sensors (U.S. Pat. No. 5,159,513; EP-B-O 346 817) or also for magnetic plotting and writing heads, communications and shielding (DE-OS 28 27 429). A marking device based upon this effect has the advantage of a highly characteristic magnetic signal strongly different from the customary magnetic marking upon application of an external magnetic field. If the external magnetic field is strong enough, the nonparallel or antiparallel couplings can be interrupted which can give rise to a change in the magnetization of the corresponding local regions. If the external magnetic field is removed, the original magnetization with nonparallel or antiparallel couplings are reshaped.

A conventional magnetic coding loses the recorded information upon magnetization to saturation since, in the remanent state, the individual regions assume the magnetization direction which is determined by the external magnetic field. This characteristic behavior of the nonparallel or antiparallel coupling regions affords the advantage that, upon producing the marking, there is predetermined locally structured magnetic pattern which serves for information storage. The magnetic behavior of this pattern in saturation and in remanence cannot be reset by pure parallel coupling magnetic coding and thus affords the aforementioned protection against falsification.

The above-described effect can also be utilized to reactivate magnetic coding which has been weakened as a result of prolonged storage time or even a lost magnetic coding, since the security device is interrupted by an external magnetic field. This opens the possibility of utilizing marking devices where magnetic coding has not previously been used, for example where an identification is only seldom required as with bank notes, parking places for vehicles, jewelry articles or the like. Since the coding is not damaged by magnetic fields and also can be reactivated at any time, there are no limits for the use of the marking device of the invention.

The marking device according to the invention has in addition the advantage that it is compatible with the conventional reading devices for magnetic data carriers, for example, AMR (anisotropic magnetoresistance) or GMR (giant magnetoresistance) sensors or magneto optical reading devices like magneto optical Kerr cell microscopes.

According to a feature of the invention, between the base layer and the coding layer at least in regions, for example, a nonpermanently magnetic intermediate layer can be disposed of such thickness that regions of nonparallel or antiparallel coupling are provided. By means of such an intermediate layer, for example of copper or chromium, utilizing usual magnetic materials for the base layer and the coding layer, like for example iron, cobalt, nickel or the like, a nonparallel or antiparallel orientation of the magnetization can be effected. Preferably the intermediate layer should be of such thickness that an antiparallel coupling is produced since that will magnetically structure the coding especially clearly. In addition, the intermediate layer should be provided only where the nonparallel coupling or an antiparallel coupling is to be effected. In this case as well, there is an especially clear magnetic structuring of the coding.

Alternatively, the coding layer can be comprised of a material which lies upon and thus intrinsically couples to the base layer in a nonparallel or antiparallel manner. Such materials are, for example, chromium as a monolayer on iron or rare earth metals like gadolinium or its alloys. With these materials the nonparallel coupling or antiparallel coupling is formed already upon direct application to the base layer and gives rise there locally to a change in the magnetic signal. This reverses itself under the effect of an external magnetic field up to saturation, i.e. in the regions where the coding layer is provided from the aforementioned material, the field strength is increased so that a certain magnetic structure obtains which can be detected by corresponding sensors. Upon removal of the external magnetic field, the original structure is again reestablished.

To produce the nonparallel or antiparallel magnetic coupling regions it suffices for the coding layer to cover only regions of the base layer. This is especially applicable to the case in which the coding layer is comprised of a material which already upon direct application to the base layer couples in a nonparallel or antiparallel manner therewith. An improved structuring of the coding can however be achieved when the base layer and the coding layer so interact that regions with nonparallel or antiparallel coupling and regions with parallel couplings are provided. This can be achieved above all in that the intermediate layer is limited to the regions where a nonparallel or antiparallel coupling is to be produced. The orientation and configuration of the base layer and coding layer can be such that, upon application of an external magnetic saturation field, a spatially nonuniform magnetization is provided which does not differ significantly from the spatial structure of the magnetization without the external magnetic field. Both magnetization impressions can be used for identification purposes on detection.

It is also advantageous for the base layer and the coding layer to be so configured that they have a uniform magnetization over the areas in a saturation magnetic field. The coding then disappears in the external magnetic field. This can be used, prior to the detection, to carry out a magnetization up to the saturation level. One can thus distinguish a coding which is produced by known methods and after through magnetization is destroyed and can no longer be reactivated and detected. By contrast thereto, the marking device according to the present invention enables, after removal of the magnetic field, the return of the original coding and its detection. The aforedescribed characteristic can be ensured most simply by providing the base layer and the coding layer of contrasting thicknesses while each generally is comprised of a single material. Under these conditions the clearest structuring can be. achieved when the base layer and the coding layer have the same magnetizations and the optional intermediate layer has such thickness that the coding layer in the region of the intermediate layer fully compensates the magnetization of the base layer. In the remaining regions, the magnetization is based upon parallel coupling.

The principles of the invention can be applied in varied form in that the base layer and/or the coding layer and/or— to the extent provided—the intermediate layers have regions composed of different materials and/or of different thicknesses. In this manner the coding can be of practically optional complexity, i.e. regions can be provided with a practically unlimited number of different magnetizations and thus even graduated values can be stored. As a consequence this ensures high reliability and effective protection against falsification.

It will be understood that the basic concept of the invention is effective not only with a single coding layer but also with a plurality of superimposed coding layers. As a result, this also enables a high complexity of the coding to be achieved. The coding layers which are used can be composed of different materials and can have different thicknesses. In the same way, the magnetic coupling of the coding layer or layers can be influenced also by the respective choice of the material and of the thicknesses of the intervening layer.

BRIEF DESCRIPTION OF THE DRAWING

The invention is described in greater detail in on junction with an embodiment shown in the drawing. In the drawing.

SPECIFIC DESCRIPTION

Figure 1:
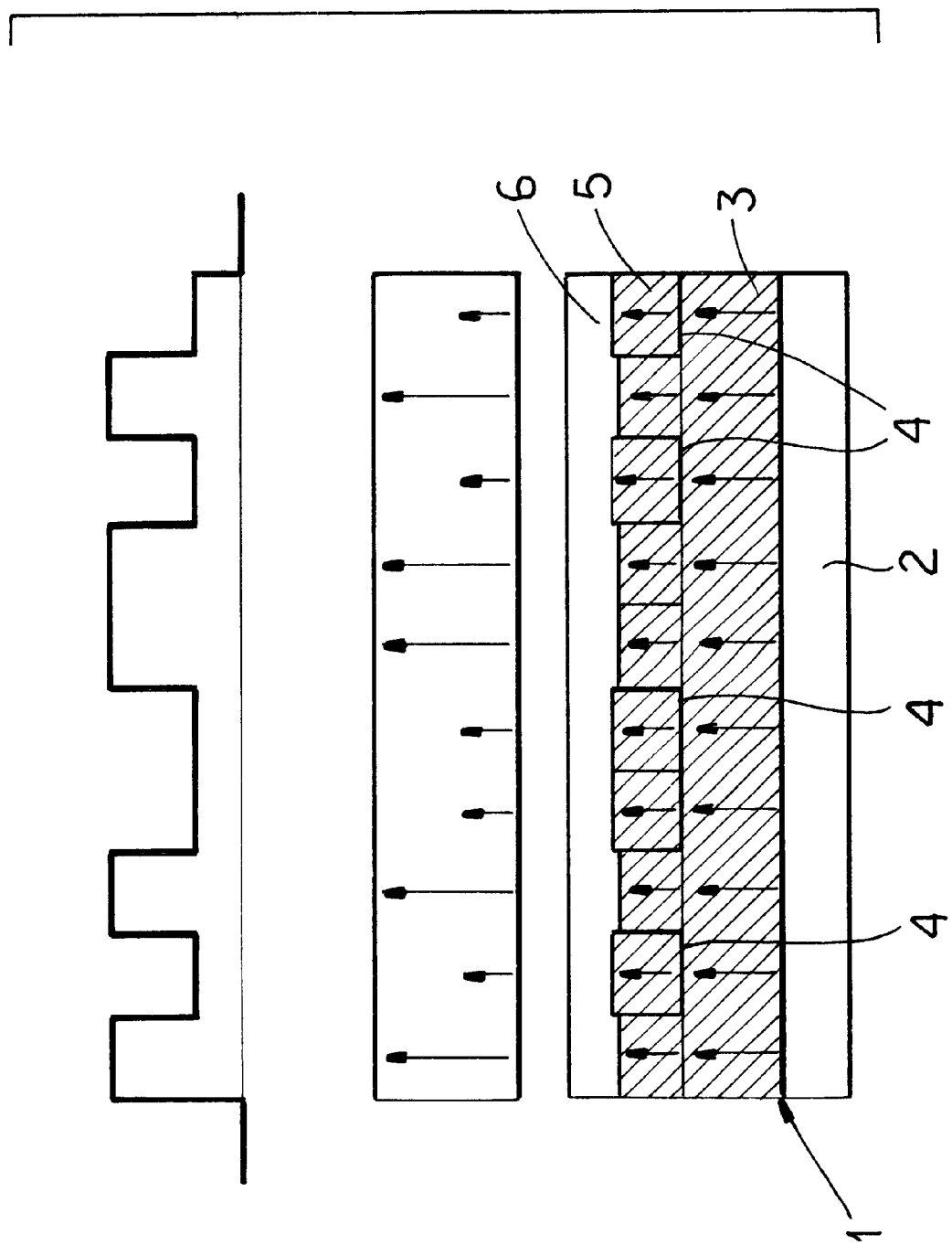
FIG. 1 is a cross section through a marking device with illustration of the magnetization structure.
Figure 2:
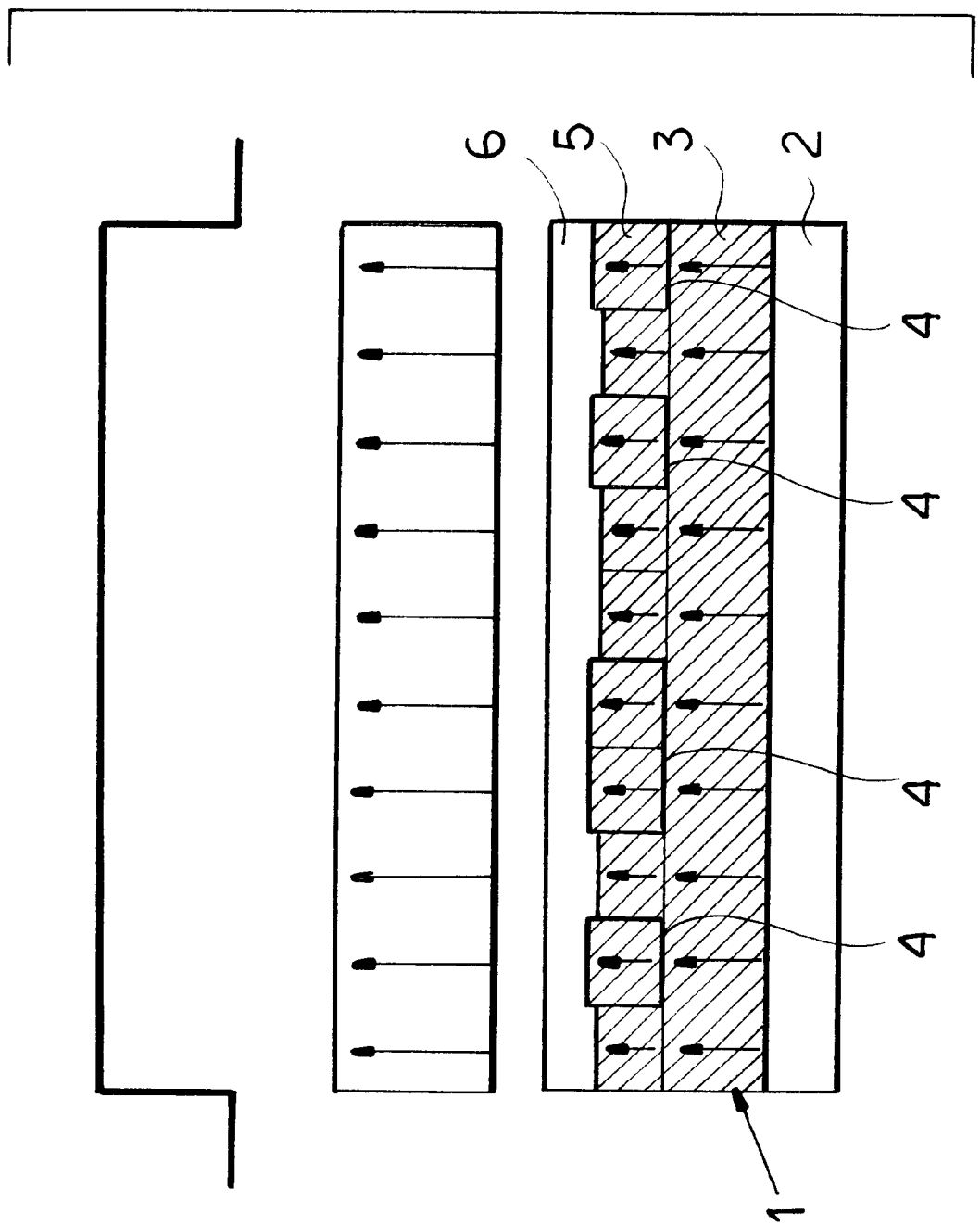
FIG. 2 is a cross section through the marking device according to claim 1 upon magnetization in the saturation range.

The marking device 1 shown in FIGS. 1 and 2 has a carrier layer 2 for example of Si/SiO2. It can have an optional thickness suitable for the respective intended purpose. Onto the carrier layer 2 a permanently magnetic base layer 3, for example of cobalt in a thickness of 40 nm, is applied. On this base layer 3 an intermediate layer 4 is applied selectively, i.e. Area wise, the intermediate layer 4 consisting for example of copper in a thickness of 0.8 nm. On the regions without the intermediate layer 4 and with the intermediate layer 4, a coding layer 5 is then applied, for example of cobalt in a thickness of about 25 nm and which is coated with a protective layer 6, for example of 50 nm thick Cu layer or a polymeric protective layer of e.g. 10 $\mu$m PMMA [polymethylmethacrylate].

The arrows qualitatively show the direction and strength of the magnetization of the base layer 3 and the coding layer 5. Nevertheless the direction of the magnetization has been rotated through 90° for the sake of illustration. With the material combination Co/Cu/Co—described here and as with most other material combinations which come under consideration, the directions of magnetization lie in the plane of the base layer 3 and the coding layer 5 and thus partly parallel and partly antiparallel.

From FIG. 1 it can be seen that the base layer 3 is magnetized uniformly over its area. The coding layer 5 is also magnetized when the field strength, as a result of the limited thickness, is smaller than that in the base layer 3. In the regions in which no intermediate layer 4 is provided, the magnetization in the coding layer 5 is parallel to and in the same direction as in the base layer. Where an intermediate layer 4 is provided, there is an antiparallel coupling of the magnetization, i.e. the magnetization of base layer 3 and coding layer 5 are oppositely directed and thus antiparallel.

Above the marking device 1, the strengths of the resulting magnetic fields are shown by arrows and thus the latter display the corresponding readout signals in a graphic trace. It can be seen that the magnetization of the base layer 3 in the regions in which there is no intermediate layer 4 is amplified by that of the coding layer 5. Where an intermediate layer 4 is applied, however, the resultant magnetic field of the total layer arrangement is weakened based upon the antiparallel coupling. As a result, the coding structure is obtained with very different resulting field strengths at the surface and which can be detected and analyzed with the aid of suitable detectors.

FIG. 2 shows the state of the marking device 1 in an external magnetic field in the saturation range. It can be seen that the antiparallel coupling is interrupted so that now at those regions of the coding layer which are separated by an intermediate layer 4 from the base layer 3, the neighboring regions are magnetized without separation by the intermediate layer in parallel and unidirectionally. Thus all of the regions are uniformly magnetized, i.e. the variation in the magnetic signal disappears. A coding is no longer provided. After removal of the outer magnetic field and with the system thus in remanence, the state shown in FIG. 1 is restored again spontaneously with parallel and antiparallel coupling.

The marking device is distinguishable from other marking devices which are produced by conventional magnetization techniques and in which the coding is extinguished by the application of an external magnetic field.

Figure 3:
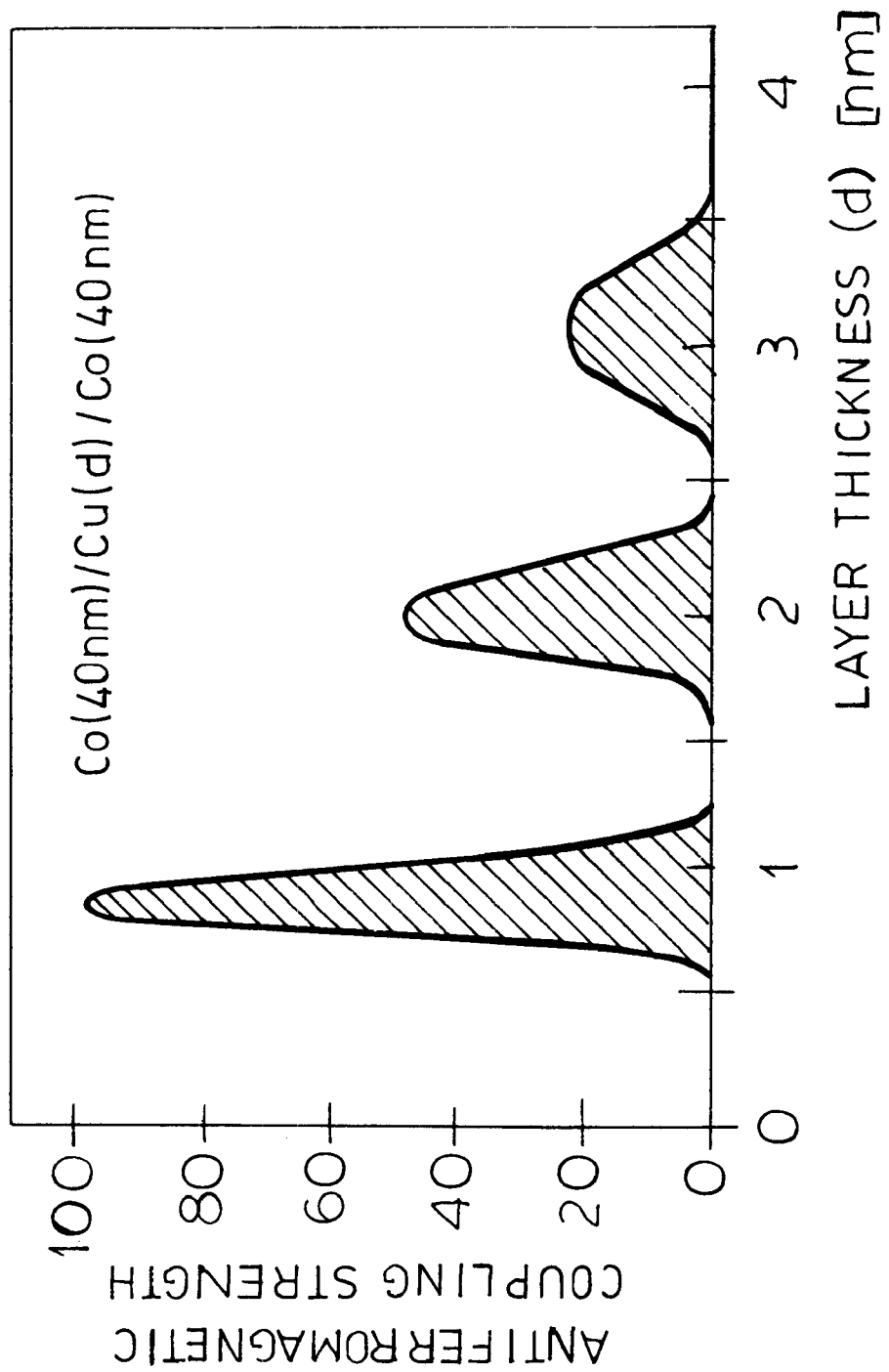
FIG. 3 a graph of the dependency of the antiparallel coupling strength upon the layer thickness of the intervening layer.

In the graph of FIG. 3 the thickness of the intermediate. layer 4 is plotted along the abscissa and the antiferromagnetic coupling strength is plotted along the ordinate, indeed for the example in which the base layer 3 and the intermediate layer 4 are comprised of cobalt each with a thickness of 40 nm. It can be seen that the level of the antiferromagnetic coupling strength varies with the thickness of intermediate layer. The highest coupling strength is achieved with about 0.8 nm. Between the extremes there is a region in which no antiparallel coupling arises but rather in which there is a coupling of less than 180°, for example about 90° to a parallel ferromagnetic coupling. Even these regions can be used to obtain a desired magnetization structure and thus coding structure with high complexity, so that not only two different total magnetizations arise as in the example according to FIG. 1, but there are a plurality or multiplicity of different magnetizations.

What is claimed is:

1. A marking device for application to an object to impart a magnetic coding thereto which has areas of different magnetizations, the device comprising at least one magnetic base layer, at least one magnetic coding layer on said base layer forming a parallel magnet coupling therewith and, between the base layer and on the coding layer, an intermediate; layer spacing said base layer and coding layer apart only in certain areas of the coding and being of a composition and thickness to impart nonparallel or antiparallel magnetic coupling between the base layer and the coding layer, the base layer and the coding layer being so configured that upon application of an external magnetic saturation field, a spatially nonuniform magnetization is provided which differs from a spatial structure of the magnetization without the external magnetic field.

2. The marking device according to claim 1 wherein the coding layer covers only selected regions of the base layer.

3. A marking device for application to an object to impart a magnetic coding thereto which has areas of different magnetizations, the device comprising at least one magnetic base layer, at least one magnetic coding layer on said base layer forming a parallel magnet coupling therewith and, between the base layer and on the coding layer, an intermediate layer spacing said base layer and coding layer apart only in certain areas of the coding and being of a composition and thickness to impart nonparallel or antiparallel magnetic coupling between the base layer and the coding layer, the base layer and the coding layer being so configured that a uniform magnetization is provided in an external magnetic field over the area.

4. The marking device according to claim 3 wherein the base layer and the coding layer have constant thicknesses and each is composed of a single material throughout.

5. The marking device according to claim 3 wherein the base layer, coding layer and intermediate layer are composed of different materials or have different thicknesses.

6. The marking device according to claim 3 wherein a plurality of coding layers are provided which so interact with the base layer that there are regions of nonparallel or antiparallel coupling.

\* \* \* \* \*